J. S. BIRCH,

Assignor, by mesne assignment, to W. A. & C. C. CUMMINGS.

Adjustable Watch-Key.

No. 7,911. Reissued Oct. 16, 1877.

*Witnesses.*

Wm. J. Morgan.

F. A. Thayer.

*Inventor.*

John S. Birch,

By A. P. Thayer, atty

N. PETERS, PHOTO-LITHOGRAPHER, WASHINGTON D. C.

UNITED STATES PATENT OFFICE.

JOHN S. BIRCH, OF NEW YORK, ASSIGNOR, BY MESNE ASSIGNMENTS, TO WILLIAM A. CUMMINGS AND CHARLES C. CUMMINGS, OF BROOKLYN, N. Y.

IMPROVEMENT IN ADJUSTABLE WATCH-KEYS.

Specification forming part of Letters Patent No. 70,787, dated November 12, 1867; Reissue No. 7,911, dated October 16, 1877; application filed September 6, 1877.

*To all whom it may concern:*

Figure 1:
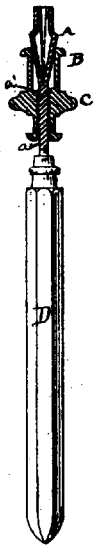
Figure 2:
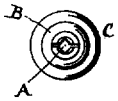

Be it known that I, JOHN S. BIRCH, of New York city, and State of New York, have invented a new and useful Improvement in Adjustable Watch-Keys, of which the following is a specification:

Figure 1 is a side view of my improved watch-key, partly in section, to show the construction. Fig. 2 is a top or end view of the same.

My invention has for its object to furnish an improved key for watches which may be adjusted to fit the post of any watch, whether large or small; and it consists of contriving the barrel in two adjustable jaws, divided or separated diagonally of the socket for the watch-post, and in combining therewith a device for adjusting the jaws to the posts of different sizes, and holding them when winding the watch.

A is the barrel of the key, the end of which has the square socket of usual form, but, instead of being solid, it is divided or separated longitudinally, to form the key in two adjustable parts or jaws to adapt it to posts of different sizes; and it will be noted that the separation or division between the said jaws is diagonally of the socket, so that they gripe the corners of the post, whereby they hold best, and the greatest strength is preserved. The part of the barrel above the socket is made to taper to the shank $a'$, so that the slide or sleeve B, fitted on the exterior of the tapered part, will close the jaws when made to slide up the taper, thus adjusting them to posts of different sizes.

C represents a nut, which screws along the shank $a'$ to adjust the sleeve.

When the tapered part of the barrel A is made cone-shaped, the sleeve and the nut may be one single device; but if the tapered part be pyramid-shaped they must be made in two separate devices.

The socket end of the barrel must be made so as to enter the ordinary key-hole of the watch-plate, and so small as to grasp the post of the smallest watch.

D is the handle of the key, which is attached to the shank $a'$, and which may be made of any size, form, or material.

Having thus described my invention, what I claim, and desire to secure by Letters Patent, is—

The combination, in a watch-key, of a barrel which consists of two adjustable jaws, which are separated diagonally of the post-socket, and constructed and adapted to apply to the winding-post through the ordinary hole of the cap of the watch, and an adjustable device which holds said jaws on posts of different sizes, substantially as described.

JOHN S. BIRCH.

Witnesses:
F. A. THAYER,
WM. J. MORGAN.